J. H. & E. W. BULLARD.
SPEEDOMETER SUPPORTING AND DRIVING MECHANISM.
APPLICATION FILED APR. 9, 1908.
986,684.
Patented Mar. 14, 1911.
3 SHEETS—SHEET 1.
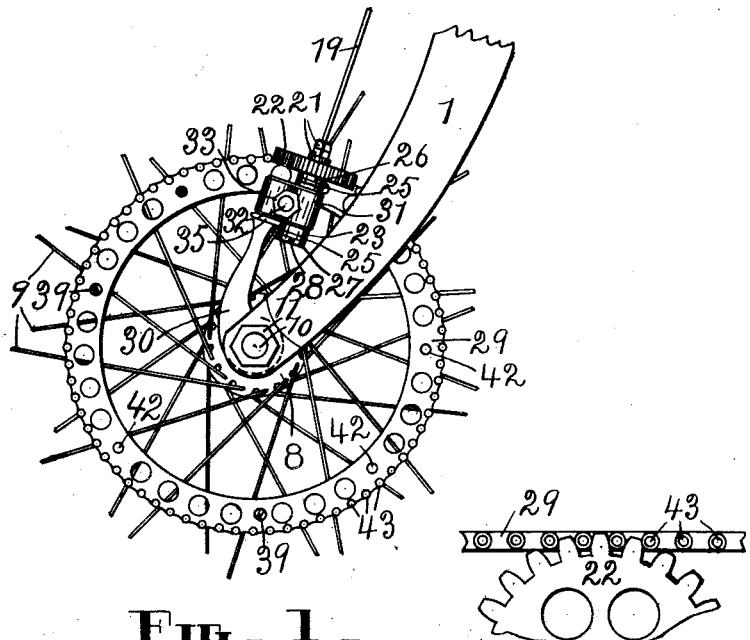
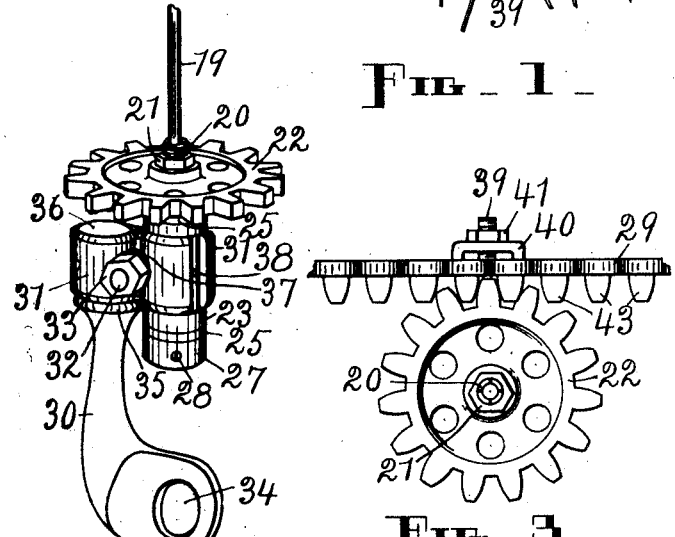
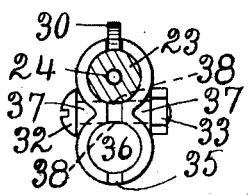
WITNESSES
A. C. Fairbanks
L. V. Pierce
INVENTORS
James H. Bullard
Edwin W. Bullard
BY Webster & Co.
ATTORNEYS

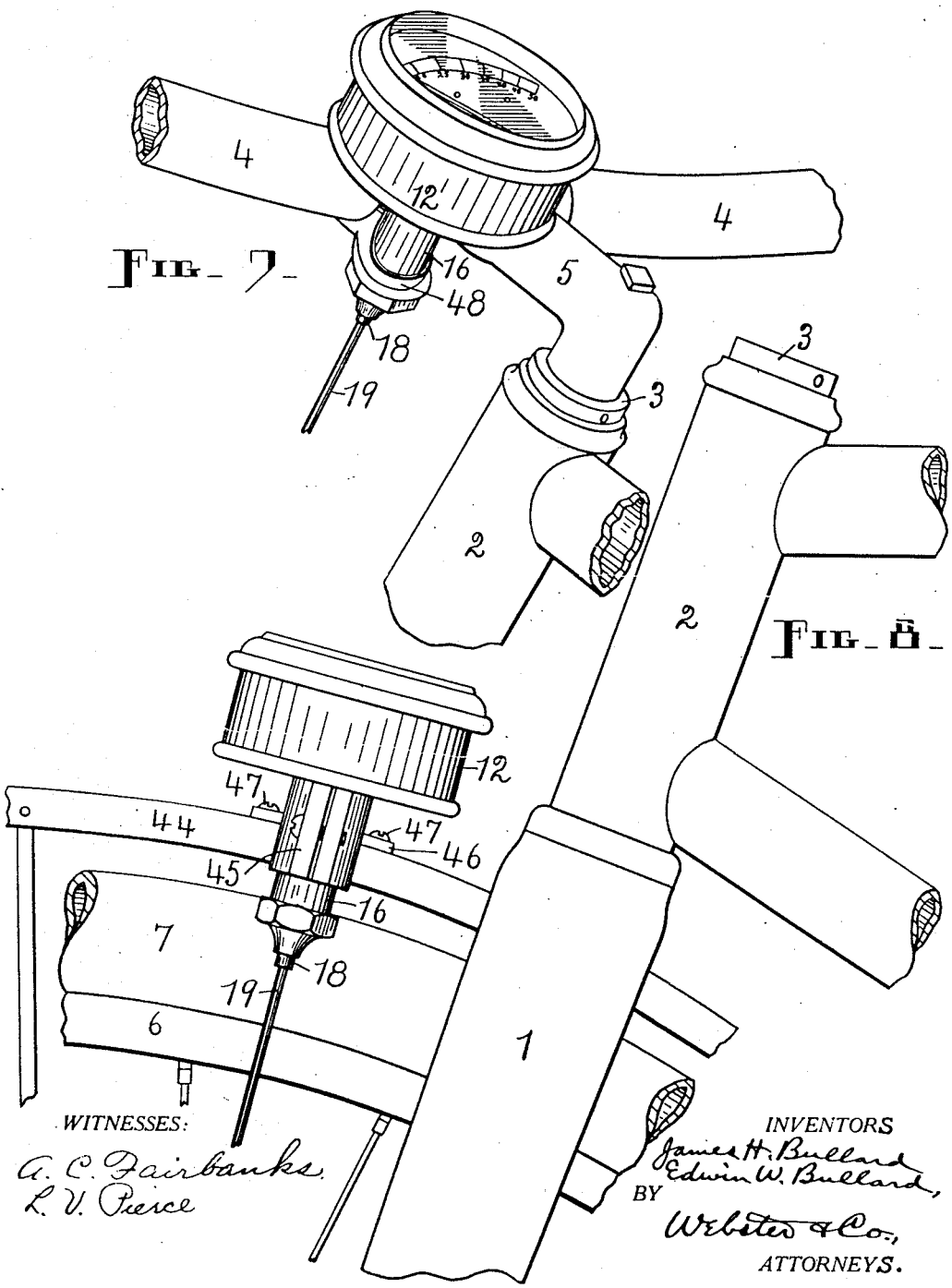

J. H. & E. W. BULLARD.
SPEEDOMETER SUPPORTING AND DRIVING MECHANISM.
APPLICATION FILED APR. 9, 1908.

986,684.

Patented Mar. 14, 1911.

WITNESSES:

INVENTORS
James H. Bullard
Edwin W. Bullard,
BY
Webster & Co.,
ATTORNEYS.

UNITED STATES PATENT OFFICE.

JAMES H. BULLARD AND EDWIN W. BULLARD, OF SPRINGFIELD, MASSACHUSETTS.

SPEEDOMETER SUPPORTING AND DRIVING MECHANISM.

986,684.

Specification of Letters Patent.

Patented Mar. 14, 1911.

Application filed April 9, 1908. Serial No. 426,015.

*To all whom it may concern:*

Be it known that we, JAMES H. BULLARD and EDWIN W. BULLARD, both citizens of the United States of America, and residents of Springfield, in the county of Hampden and State of Massachusetts, have invented new and useful Speedometer Supporting and Driving Mechanism, of which the following is a specification.

Our invention relates to improvements in means and mechanism for supporting speedometers on the front fork sections of bicycles and motor-cycles and for driving them from the wheels of such sections, and consists of certain peculiar clips, brackets, gears, and connections, all as hereinafter set forth.

The objects of our invention are, first, to provide an equipment whereby a speedometer can be supported by and driven from the front fork section, including the front wheel, of a cycle whether motor propelled or not, thus locating said speedometer within range of the eye of the rider when fixed on the road ahead, permitting a comparatively short shaft to be employed, and avoiding any liability of unduly straining said shaft; second, to provide simple but efficient means for mounting and connecting the speedometer on and with the front fork section, including the wheel, of any cycle; third, to furnish driving mechanism or gearing for the speedometer which is self-cleaning, and, fourth, to afford a large amount of adjustment for the driving pinion so that it can always be properly positioned relative to the gear on the wheel which revolves said pinion. We attain these and other objects which will appear in the course of this description by the means and mechanism illustrated in the accompanying drawings, in which—

Figure 9:
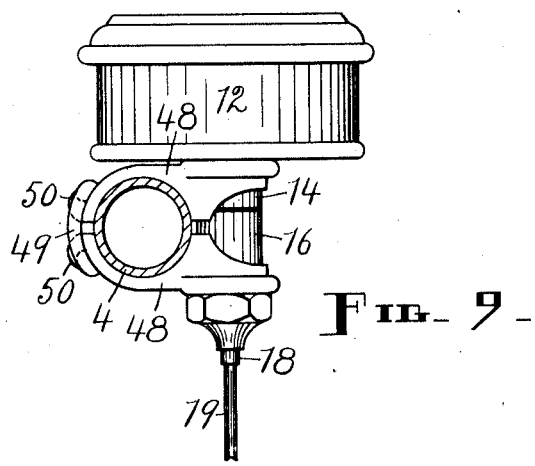
Figure 10:
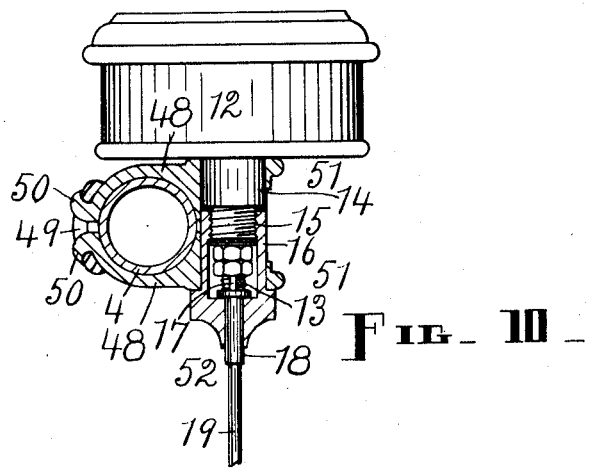

Figure 1 is a side elevation on a reduced scale of the hub portions of the front fork and wheel of a cycle with our driving mechanism attached; Fig. 2, a perspective view of the pinion and the bracket and clips therefor; Fig. 3, a plan view of the pinion showing it in mesh with a fragment of the driving gear, also showing one of the clips by means of which said gear is fastened to the spokes of the wheel; Fig. 4, a front elevation of the pinion bracket and clips; Fig. 5, a plan view of said pinion bracket and clips; Fig. 6, a view showing a modified form of pinion and gear; Fig. 7, a perspective view illustrating the manner in which the speedometer is attached to one of the handle bars; Fig. 8, an elevation of parts of a cycle showing the speedometer mounted on the front mud-guard; Fig. 9, a detail view showing the device used to secure the speedometer to the handle-bar, and Fig. 10, a detail in section of the same.

Similar figures refer to similar parts throughout the several views.

The cycle members shown in the drawings are parts of a front fork 1, a head 2 mounted on the post 3 of said fork, and handle-bars 4—4 united with an angular supporting member 5 which latter is socketed in said post; a rim 6, a tire 7, a hub 8, and spokes 9 of a front wheel; and an axle 10 and nut 11 thereon; also a mud-guard 44, which parts are all old and well-known. With the exception of the head 2, the aforesaid parts all turn together in the act of steering the machine into the construction of which they enter.

A speedometer is represented at 12, which is provided with an operating spindle 13 extending downward through a fixed sleeve 14 depending from the bottom of the speedometer case. The sleeve 14 has a shoulder 15 and is screw-threaded below such shoulder to receive a sleeve 16, the purpose of which will be presently explained. There is a slot in the bottom of the spindle 13 to receive a flat fin or lug 17 on the coupling piece 18 of a shaft 19 from which or through the medium of which latter motion is imparted to said spindle. The shaft 19 may or may not be flexible. The other terminal of the shaft 19, that is, the lower terminal, is received into a spindle 20 which is secured to said terminal by means of nuts 21, the screw-threaded end of said spindle being split to afford the necessary binding contact between the shaft and spindle when said nuts are screwed on to the latter. The spindle 20 is for a pinion 22 which is tight thereon below the nuts 21.

A plug 23 is provided for the spindle 20, the latter being received into a longitudinal passage 24, Fig. 5, through such plug. Anti-friction devices for the spindle 20 and pinion 22 are shown in the form of rings 25—25, one between the hub 26 of said pinion and a shoulder on the plug 23, and the other between the base of said plug and a collar 27 fastened to the lower terminal of the spindle by a screw 28, but ball-bearings may be substituted for such anti-friction rings.

The plug 23, with its spindle and pinion, is mounted in position to have said pinion mesh with a gear 29, carried by the spokes 9, by means of a hanger or bracket 30, two clips 31, and a screw 32 and nut 33. The bracket 30 comprises a short thin arm which is perforated at 34 to receive the axle 10, and a longer arm which is provided with a shoulder 35 and terminates in a post 36. The clips 31 have segmental parts which fit the post 36 and the plug 23 without meeting, they are laterally perforated for the screw 32, and they also have bosses 37—37 for the accommodation of the head of said screw and the nut 33. There is an annular groove 38 in the post 36 and another in the plug 23 for the screw 32. It will now be seen that when the clips 31 are clamped on to the post and plug, with the screw 32 and nut 33 in place and the latter screwed up tight, said plug forms a rigid support from the bracket 30 for the spindle 20 and pinion 22. The frictional resistance afforded by the clips 31 prevents any movement about the axis of the post or any rotation on the part of the plug, and in addition to this resistance there is a positive lock between the screw and the grooved parts of the post and plug which holds the members against independent endwise movement. Adjustment about the axis of the post is easily effected, however, when the nut is loose. The shoulder 35 on the post affords additional security to the clips when said post is directed upward. The bracket 30 is mounted on the axle 10 at one side of the wheel, with its short arm held rigidly between the usual ball-cone for the hub 8 and the fork arm on that side, and can be adjusted on said axle so as to stand in whatever position may be required upon loosening the nut 11. With some wheels it is necessary to arrange the bracket 30 with the post 36 pointing downward instead of upward as in the drawings.

The gear 29 is fastened to the spokes 9 by means of screws 39, bridge clips 40, and nuts 41, each of said clips bridging one or two of the spokes which are adjacent to one of the holes 42 provided in said gear for said screws. The teeth 43 of the gear 29 are in the form of tapered pins projecting from one side of said gear to mesh with the teeth of the pinion 22, and the construction of both sets of teeth is such that those of one set clear the bottoms of the spaces between those of the other set, as will be plainly seen upon referring to Fig. 3. And it is by reason of this construction and arrangement of the two sets of teeth, or this provision for clearance, that the meshing members are self-cleaning, because as said members revolve the teeth cut the dirt and prevent the same from accumulating between them, which is a very necessary and valuable feature in mechanism of this kind, if the speedometer is to be made to respond to the motion imparted thereto from the wheel of the cycle and to register accurately, such motion being communicated through the medium of the meshing members and the shaft 19, as will be readily understood.

In the event that the clearance between the spokes and fork arm of the wheel on one side is too narrow to admit the side-toothed gear, a gear having peripheral pin teeth, such as appears in Fig. 6, may be substituted.

The speedometer may be mounted in any suitable manner, over the driving mechanism above described, either on one of the handle-bars or on the mud-guard, preferably on the former. When mounting the speedometer 12 on the mud-guard 44 we may make use of a split clip 45 which clamps around the sleeve 16 and has a plate extension 46 which is secured to said mud-guard at 47—47. But as a fastening means between one of the handle-bars 4 and the speedometer 12, we prefer to employ two clips 48, and a link 49. The clips 48 are concaved on the inside to fit the handle-bar, and each has a horn or hook 50 at one end for the link 49, and an opening 51 through the other end to receive either the fixed sleeve 14 or the detachable sleeve 16. The base of the sleeve 16 is in the form of a nut, so that when the clips are placed on the handle-bar and connected by the link and the two sleeves are inserted in the openings 51 the sleeve 16 can be screwed up on the threaded terminal of the sleeve 14 to draw the perforated ends of said clips together between the bottom of the speedometer and said nut and clamp the clips tightly around said handle-bar, provision thus being made for securing the speedometer at any desired point on said bar.

The coupling piece 18 rotates in a suitable opening through the base of the sleeve 16 and has a flange 52 within the larger opening in said sleeve which prevents said coupling piece from being drawn through such base.

From the foregoing it is plain that when the driving mechanism is properly attached to the wheel and accurately adjusted the rotary motion of said wheel is communicated through the shaft 19 to the spindle 18 of the speedometer, and that there is no danger of cramping or otherwise injuring said shaft while steering the machine since all of the members which are associated either actively or passively with said speedometer are supported by the steering gear of said machine, including the wheel and all of the front section of the machine except the head 2.

What we claim as our invention, and desire to secure by Letters Patent, is—

1. The combination, in a cycle, with the front fork, a supporting wheel mounted between the arms of said fork arms, and a handle at the top portion of said fork, of a gear mounted on one face of such wheel, an adjustable bracket mounted on the same center with the wheel, a gear adjustably supported by said bracket and adapted to mesh with the wheel gear, a shaft arranged to revolve with the bracket gear, and a speedometer mounted on the said handle and in engagement with said shaft.

2. The combination with the front fork, axle, wheel and handle bar of a cycle, all mounted to turn together, of a speedometer-driving gear attached to said wheel, a bracket or hanger adjustably mounted on said axle with the latter as a pivotal point, a pinion adjustably supported by said bracket and in mesh with a gear, a speedometer mounted on the handle bar, and a rotary shaft extending from the pinion to the speedometer.

3. A support, for a speedometer driving pinion, comprising a bracket provided at one terminal with an axle bearing and at the other terminal with a post and a shoulder, a bearing plug, a pair of clips adapted to partly embrace said post above said shoulder and said plug, and intermediate means to forcibly retain said clips in contact with the post and plug.

4. A support, for a speedometer driving pinion, comprising a bracket provided with a grooved post, a grooved bearing plug, a pair of clips adapted to partly embrace said post and said plug, and a screw and nut to forcibly retain said clips in contact with the post and plug, said screw engaging the edges of the grooved parts of the post and plug.

5. The combination, with a supporting member of the front fork section of a cycle, of a speedometer having a fixed sleeve, a removable sleeve attached to said fixed sleeve, a pair of clips provided with link connections at one end and being perforated to receive said sleeves at the other end and fitting said supporting member, and a link attached to said link connections.

6. The combination, with a supporting member of the front fork section of a cycle, of a speedometer having a fixed screw-threaded sleeve, a combined sleeve and nut to engage the threaded portion of said fixed sleeve, a pair of clips provided with link connections at one end and being perforated to receive said sleeves at the other end and fitting said supporting member, and a link attached to said link connections, the arrangement being such that the clips are caused to forcibly engage said supporting member when the sleeve and nut member is tightened.

7. The combination, of a speedometer having a fixed sleeve and provided with a revoluble spindle which extends through such sleeve, a removable sleeve attached to such fixed sleeve, a shaft provided with a flanged coupling piece rotatably supported by such removable sleeve with its flange inside of the sleeve, said flange having a larger diameter than that of the bore in the sleeve for the main part of the coupling piece, and means of connection between said spindle and said coupling piece to cause them to revolve together.

8. The combination, of a speedometer having a fixed sleeve and provided with a revoluble slotted spindle which extends through such sleeve, a detachable sleeve fastened to said fixed sleeve, a shaft provided with a flanged coupling piece rotatably supported by said detachable sleeve with its flange inside of the sleeve, said flange having a larger diameter than that of the bore in the sleeve for the main part of the coupling piece, and a lug rising from the coupling piece into the slot in said spindle.

JAMES H. BULLARD.
EDWIN W. BULLARD.

Witnesses:
A. C. FAIRBANKS,
F. A. CUTTER.